May 3, 1960 F. HULSTER 2,935,645

HIGH FREQUENCY ELECTRIC DISCHARGE DEVICES

Filed Feb. 12, 1958 2 Sheets-Sheet 1

INVENTOR:
FRIEDRICH HULSTER,
BY Philip R. Schlang
HIS ATTORNEY.

May 3, 1960 F. HULSTER 2,935,645

HIGH FREQUENCY ELECTRIC DISCHARGE DEVICES

Filed Feb. 12, 1958 2 Sheets-Sheet 2

INVENTOR:
FRIEDRICH HULSTER,

BY Philip R. Schlang

HIS ATTORNEY.

United States Patent Office 2,935,645
Patented May 3, 1960

2,935,645

HIGH FREQUENCY ELECTRIC DISCHARGE DEVICES

Friedrich Hulster, Celle-St-Cloud, France, assignor to Compagnie Francaise Thomson-Houston, Paris, France Application February 12, 1958, Serial No. 718,938

Claims priority, application France February 27, 1957

22 Claims. (Cl. 315—39.73)

My invention relates to high frequency electric discharge devices with crossed electric and magnetic fields and pertains more particularly to ultra-high frequency oscillators capable of being tuned in a wide frequency range by varying the anode voltage.

For certain ultra-high frequency applications, for example, in a frequency modulation system, oscillators are required the frequency of which may be varied electronically, that is to say, by acting upon one single voltage and without mechanically affecting the circuits or their means of coupling. Various devices have, heretofore, been adapted to such applications, such, for example, as the reflex type klystron, the traveling wave tube, and the multivane-anode magnetron. Some of these devices, however, have either been limited in frequency tuning range, or required undesirably cumbersome and expensive auxiliary equipment.

The present invention contemplates an oscillator which is somewhat similar in operation to a magnetron in that high frequency energy can be extracted therefrom by virtue of the effects of a circular movement of electrons in crossed electric and magnetic fields. In the presently contemplated device, however, the high frequency interacting electric field is produced neither by line nor by localized circuits, but instead by electrical charges induced in a high-resistivity conductive wall cylindrical body as the effects of space charges passing close to the surface of that body. Means is provided whereby a cloud of space charges is created which rotates inside the cylinder about the longitudinal axis thereof. According to one embodiment of the invention the high resistivity cylinder surrounds coaxially a cylindrical cathode and forms the anode of the device.

The electrical operation of the present device is based, in part, on the fact that when an electron beam passes parallel to the surface of a very high resistivity conductive body, any grouping or bunching of electrons in the beam is amplified. This effect is due to image charges induced by the charges of the electron beam in the surface zone of the high resistivity body. The induced charges lag slightly behind the charges of the beam. The latter are, therefore, always in a deceleration field which reinforces their concentration or grouping. A wall made of a low resistivity material or a good conductor does not have this effect since in this case the image charges would travel in lateral alignment with the charges of the beam which is different than with the use of a high resistivity material, in which the image charges lag the beam charges. For a sinusoidal modulation of the beam, the charge distribution is also sinusoidal on the surface of the high-resistivity body. This accounts for the use of the terms "charge waves" and "length of charge wave" herein employed. But the phenomenon under consideration is distinguishable clearly from that of waves traveling along a delay line. The charge waves in the presently considered device are produced at the surface of the high-resistivity body by electrical induction alone. In the absence of a modulated beam, charge waves do not travel but are dissipated, whereas in an electrical line, especially a delay line, the combination of electric and magnetic disturbances which constitute the wave travels all alone with a velocity which depends upon the distributed capacitance and inductance of the line.

These phenomena as well as an amplifier based on them have been described by Ch K. Birdsall, G. R. Brewer and A. V. Haeff in the paper: "The resistive wall amplifier" published on pages 865–874 inclusive of the 1953 volume of the Proceedings of the Institute of Radio Engineers. Owing to the absence of resonating circuits and delay lines, the bandwidth of the "resistive wall amplifier" is very great; it depends on certain qualities of the high-resistivity conductive wall, especially on its dielectric constant and specific resistivity, and may exceed 30% of the center frequency.

Theoretically the "resistive wall amplifier" may be converted into an electronically tunable oscillator, by connecting its input to its output. As the number of waves traveling in the circuit must be an integer, it is obvious that for a given number of waves the oscillating frequency is proportional to the velocity of the waves. Thus electronic tuning is possible, the velocity of the waves being equal to that of the beam. However, the number of waves is not a priori definite; hence the excited frequency may vary abruptly following a change in the number of waves, designated as mode changing. To avoid this, the feed-back line connecting input and output must contain a filter having a bandwidth smaller than the difference of the frequencies corresponding to adjacent modes. The electronical tuning range is then equal to the bandwidth of that filter. Now, amplification by resistive wall effect yields only a small gain. The resistive body must therefore be rather long; it conveys then a high number of waves. Consequently the oscillating modes are closely spaced and the electronical tuning range is small.

To realize electronic tuning within a wide bandwidth, the present invention uses the effect of induced charges in a high-resistivity wall in connection with a more efficacious electronic mechanism than is the case in the resistive wall amplifier. The electronic interaction principle of the new oscillator is that generally employed in multivane-anode magnetrons. In the latter, the electrons revolve about the cathode at the same angular velocity as the electric high-frequency field of the anode. The electrons are bunched in the regions of the decelerating field and cede energy to this field. But then electrons still maintain their angular velocity; in proportion as they give up energy they advance in a radial direction, thus picking up energy in the D.C. anode field. The advantage of this mechanism lies in the fact that the electrons can remain for a long time in the high-frequency field, for example for several revolutions about the cathode. This gives an intensive amplification of the electromagnetic waves traveling circumferentially along the anode structure. The feedback is doubled inasmuch as the anode structure as well as the electron beam are closed on themselves.

The device proposed by the present invention may be derived from this type of magnetrons by replacing its anode structure by a cylindrical body formed of a high-resistivity conductive material. When the tube is oscillating, electric charges travel on the inside high-resistivity conductive surface or wall of the cylinder with the velocity of the electrons, just as in the case of the "resistive wall amplifier." Now, in crossed electric and magnetic fields the mean angular velocity of the electrons is proportional to the quotient anode voltage divided by magnetic induction. Thus, for a given number of charge waves traveling on the anode cylinder; any point of this cylinder takes an alternating potential the frequency of which is proportional to the anode voltage and may be tuned by varying the latter voltage. Owing to the cumulative effect of the multiple paths of the electrons and the doubly insured feedback, the circumference of the cylinder may be much shorter than the straight resistance body of the oscillator derived from the "resistive wall amplifier." For a given frequency, a very small number of charge waves, for example 1 to 3, will travel along the inner cylindrical surface. That means that the frequencies corresponding to adjacent modes are far enough from one another for only one of them to be excited at a time, taking into account the above mentioned finite bandwidth which is characteristic of the effect of the induced charges in resistive walls. Within the frequency band so determined oscillating frequency may be tuned by varying the anode voltage.

Although the electronic interaction mechanism of the new tube largely eliminates changes of oscillating modes, the present invention contemplates also the provision of additional means for eliminating undesirable modes. For example, for certain electric and magnetic operational conditions, the shape of the electron trajectories favors the appearance, on the high-resistivity body, of two groups of circulating charges. The conditions for their appearance are those under which a magnetron with 4 anode segments is usually operated, which is the $\pi$ mode. That is, a device involving "waves of the 2nd order" or a magnetron wherein 2 complete wavelengths are established in the interaction region or as seen by the rotating electrons. The conditions are summarized in the approximate formula:

$$f=5.5\times10^{7}Ua/r^{2}_{a}B$$

where $f$ is the wave frequency
$Ua$ is the anode voltage
$r_a$ is the anode beam or inside radius of the high-resistivity cylinder (in cm.)

B is the magnetic induction (in gauss). According to the invention, the anode diameter of the tube, the means for inducing the magnetic field, and the anode voltage can be so calculated that this condition will be practically satisfied within the tuning range under consideration. Additionally, and according to another modification of the invention, points of the high-resistivity body in which, for a desired mode, the alternating voltages produced by the moving charges are in phase, are connected together electrically. These can be any points, but must be ones which are separated in a tangential direction by a distance equal to the length of the charge wave. For reasons of symmetry, a second series of points whose alternating voltage makes an angle of 180° with the first can be provided and conductively connected together. The conductors joining the two series of points may be used to supply the useful output.

Thus, a primary object of the present invention is to provide a new and improved electric discharge device adapted for electronic tuning over a wide frequency range.

Another object of the present invention is to provide a new and improved high frequency electric discharge device including improved means for suppressing undesired energy modes.

Another object of the present invention is to provide a new and improved ultra-high frequency electric discharge device which is simple and inexpensive in construction and operation.

Further objects and advantages of my invention will become apparent as the following description proceeds, reference being had to the accompanying drawing in which:

Figure 9 illustrates other alternative modified constructions of the cylinder and filamentary conductors;

Figure 10 illustrates a modified cylinder construction including vane-like conductors; and Figure 11 illustrates still another modified cylinder construction including vane-like conductors and a split cylinder.

Figure 1:
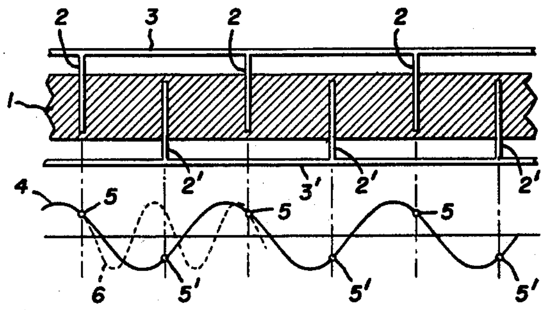
Figure 1 is a somewhat schematic illustration of a development of a high-resistivity conductive wall cylinder constructed in accordance with features of the present invention.

Referring now to Figure 1 and by way of a preliminary introduction to the structural details and operation of the various embodiments of the invention, there is illustrated a development of a high-resistivity conductive material cylinder 1. Provided in the walls of the cylinder 1 is a set of elongated filamentary conductors 2 arranged in longitudinally extending parallel spaced relation corresponding to the spacing between adjacent charge waves. End portions of the conductors 2 extend from one end of the cylinder and are interconnected by an annular conductor 3. Another set of filamentary conductors 2' are symmetrically disposed in the walls of the cylinder and include end portions extending from the opposite end of the cylinder and interconnected by an annular conductor 3'. Thus, the sets of conductors 2 and 2' are interdigitally arranged in the cylinder wall with the conductors of each set being interconnected by a conductive ring.

In Fig. 1 the sine wave 4 represents, for the required mode, the voltage distribution at any instant. The voltages 5 at the conductors 2 are the same. The same applies to the voltages 5' of the conductors 2'. Thus, it will be seen that the inserted conductors do not interfere with the propagation of the voltages and charges in the desired modes. The other modes are disturbed except, of course, those the wavelength of which is a whole submultiple of the spacing of the conductors of one series. Exemplary of one of these last-mentioned modes, the dash-line sine wave 6 shows the voltage distribution. But the voltages corresponding to these modes are already harmonics of the required frequency. By a suitable choice of the operating conditions it is possible to eliminate their excitation.

In a multi-vane-anode magnetron, the widest electronic tuning range is obtained when the saturation emission of the cathode limits the anode current to a small value. The electronic operation of a magnetron is somewhat similar to that of the new tube and, provisions must be made in certain applications of the present device for regulating cathode emission. In the case where the cathode lies inside the high-resistivity cylinder, use can be made of cathodes the emission of which can be readily adapted as a function of their temperature, for example, cathodes made of pure metal.

Figure 2:
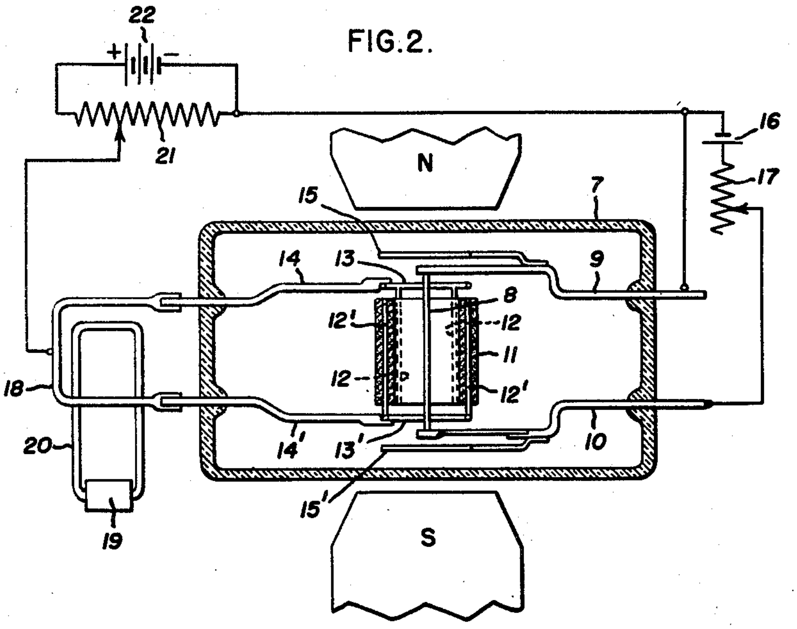
Figure 2 is a somewhat schematic and partially sectionalized view of a device according to the present invention.
Figure 3:
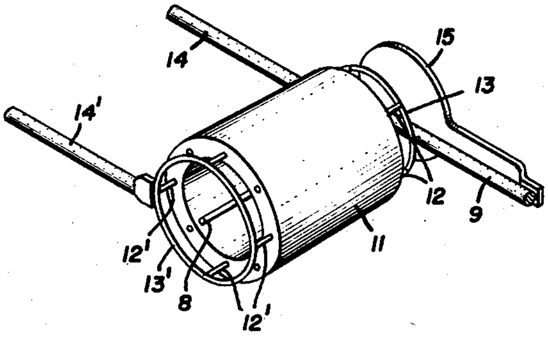
Figure 3 is a perspective view illustrating a form of the high-resistivity conductive wall cylinder employable in the present device.

In Figures 2 and 3 is illustrated an embodiment of the present invention including a hermetically sealed evacuated envelope 7 and a filamentary cathode 8 which can be made of a pure metal, for example of tungsten, and is held between rods or leads 9 and 10 extending through and suitably sealed in a wall of the envelope. Positioned about the cathode is a cylindrical anode 11. The anode 11 comprises a cylinder of the type illustrated as a development in Fig. 1 and is made of a low-conductivity or high-resistivity conductive material. Preferably the electrical resistance of the anode 11 should exceed approximately 1000 ohms per cm. measured along the circumference of the anode. This can be obtained, for example, by forming the anode 11 of a ceramic containing an amount of graphite which will provide the desired high-resistance conductivity.

In the body of the anode 11 are inserted two series of four metal conductors or bars 12 and 12', formed, for example of molybdenum. These bars correspond to the bars 2 and 2' of Figure 1. The bars of the two series project beyond the edges of the cylinder 11 at both ends and are respectively connected to annular conductors or collector rings 13 and 13'. The device may thus oscillate in a mode for which four complete waves of charge and voltage will circulate in a circumferential direction. The bars 12 and 12' and the circular collectors 13 and 13' fasten the anode mechanically to support rods or leads 14 and 14' extending through and suitably sealed in a side wall of the envelope 7. As seen in Figure 2, the support rods 14 and 14' also serve as the high frequency output for the device. Metal disks 15 and 15' fastened to the cathode supports 9 and 10, respectively, are disposed adjacent the ends of the anode 11 to serve to induce a field which minimizes the emanation of electrons from the interior of the anode.

Figure 2 also shows schematically the operating means inside the tube: the cathode support rod or leads 8 and 9 are connected with a source of heating voltage 16 through a variable resistor 17; the latter being adapted for selective adjustments of the cathode emission. The two high-frequency leads 14 and 14' are connected by a loop 18, to which a useful load 19 is coupled by means of a loop 20. The assembly comprising the conducting and coupling elements 13, 13', 14, 14', 18, 19, 20 may introduce some ohmic resistance between the groups of rods 12 and 12' over the entire range of frequency desired; however, by acting on the surge impedance of the line formed by the elements 14, 14' and 18 and the degree of coupling of the load, a resonant circuit with a low Q may be formed and thus facilitate the elimination of the modes of undesired oscillations. The anode voltage is picked up on a potentiometer 21 supplied from a source 22, and connected between one of the cathode leads and the midpoint of the loop 18.

In operation of the device, the electrons emitted by the cathode 8 are caused to rotate about the cathode within the anode. This rotation is caused by the effects of a magnetic field extending substantially axially through the device and provided by a magnet having pole pieces designated N and S disposed each at an opposite end of the envelope 7. The rotating electrons form a cylindrical sheet-like beam or cloud which in rotating moves substantially parallel to the inner circumferential surface of the high resistivity cylindrical anode. Such an electron cloud or beam is always noise-modulated; i.e., it comprises randomly distributed bunches. These electron bunches induce image charges traveling on the inner anode surface with the angular velocity of the electron bunches but slightly behind the latter. As pointed out above, grouping of electrons in the beam and grouping of charges in the wall of the anode reinforce each other. The angular charge density distribution along the inner surface of the anode can be submitted to spatial harmonic decomposition which gives a series of sinusoidal "charge wave" sets. Owing to the annular shape of the anode, each wave set must comprise an integral number of waves. Without the conductors 12, 12', the fundamental wave set would comprise only one wave, and this wave and its spatial harmonies would yield, between any two points of the circumference, an alternating voltage, the spectrum of which comprises the revolution frequency $f_0$ of the electron cloud and the harmonics of this frequency. In the presence of the two sets of four conductors 12, 12' only those charge wave sets can travel which yield an identical potential at four regularly spaced points of the circumference, i.e. wave sets comprising $4n$ waves along the circumference, where $n$ is an integer. These charge wave sets yield between the two sets of conductors 12, 12' an alternating voltage the spectrum of which contains only the frequencies $4nf_0$. These frequencies being spaced far apart, only one of them will be excited owing to the above mentioned finite bandwidth, characteristic of the effect of induced charges in a resistive wall. Moreover, the frequency band is limited by the output circuit comprising the two sets of conductors 12, 12', the collector rings 13, 13', the anode leads 14, 14' and the loop 18. Within the frequency band so determined the excited frequency is variable by varying the applied anode voltage, as by manipulating potentiometer 21, for this frequency is a harmonic of the cloud rotation frequency, which is itself proportional to the anode voltage.

Figure 4:
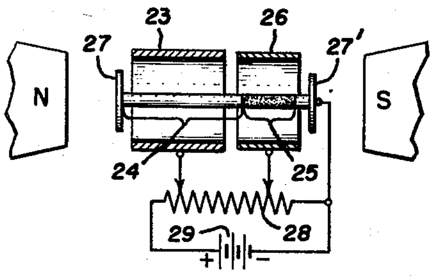
Figure 4 is a fragmentary schematic illustration of a modified form of the invention.

The oscillator, according to the present invention, can be realized in various forms with regard to its entire construction and the type of components incorporated therein. In Figure 4 is illustrated a schematic cross section of one modified form of the present invention wherein the electrons are produced in an auxiliary diode lying outside the anode cylinder and are injected into the latter. In the illustration of this embodiment, as well as the others to follow, the hermetically sealed evacuated envelope is omitted but should be understood as having been provided. Also provided but not shown in Figures 4–6 for purposes of simplifying the illustration are opposed series of interdigital conductors in the walls of the high-resistivity anodes and corresponding to the conductors 2 and 2' of Figure 1. In this embodiment a cylindrical anode 23, made of a high-resistivity conductive material, surrounds a cylindrical non-emissive coaxial conductor 24 to which is connected longitudinally outwardly of the anode 23 a cylindrical emissive cathode 25. Together with a cylindrical electrode 26, the emissive cathode 25 constitutes an electron injection system. Metal disks 27 and 27' maintained at cathode potential and disposed at opposite ends of the device limit the discharge space on both ends of the device. The voltages of the anodes 23 and electrode 26 are picked up at different points on a potentiometer 28 fed from a source 29. A magnet whose pole pieces N and S are visible produces a uniform magnetic field along the entire length of the structure. The voltage applied to the electrode 26 determines the electron current and is lower than that of the anode 23. The potential difference between the anode 23 and electrode 26 produces an axial component of the electric field which attracts the rotating electron cloud toward the high-frequency interaction space. By varying this potential difference, the amount of electrons thus injected into the high-frequency interaction space can be varied, thus to vary the power output of the device.

Figure 5:
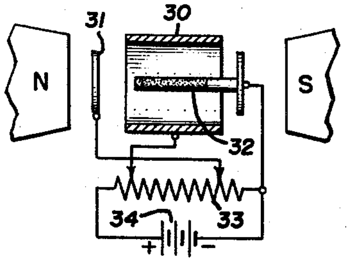
Figure 5 is a fragmentary schematic illustration of another modified form of the invention.

Under certain operating conditions, it may be desirable to increase the heat dissipation from the anode. With the high-resistivity material of the anode, the anode is heated not only by electron bombardment, but also by the inductive heating effects of alternating currents and direct currents passing through the resistance material of which the anode is formed. Moreover, the low electric conductivity is generally accompanied by a low thermal conductivity. The difficulties which may result from these circumstances are minimized in a modification of the invention according to which the electron bombardment of the high resistivity cylindrical element is greatly reduced or even eliminated altogether. In this latter case, the cylindrical element is therefore no longer an anode proper. Figure 5 shows schematically the arrangement of the main elements of such a device. Facing one end of a high-resistivity conductive cylinder 30 is an electron attraction electrode 31 which, when raised to a positive potential with respect to an emissive cathode 32, produces inside the cylinder 30 a small axial component of an electric field. Under the effect of this component, the rotating electron cloud moves slowly toward the electrode 31. The latter intercepts a certain amount of the electrons constituting the cloud depending upon the ratio of the two positive voltages. But, before reaching the other electrodes, the electrons may make a large number of turns around the cathode, and the energy exchange is substantially the same as in a device with a purely radial field. A potentiometer 33, supplied by a source 34, serves to adjust the optimum ratio of the two positive voltages. The desired effect, that is, the reduction in the electron bombardment of the high-resistivity electrode 30 with resultant reduced heating of the electrode 30, may also be attained if, instead of one extraction electrode 31, two are used which are mounted adjacent the two ends of the anode.

Figure 6:
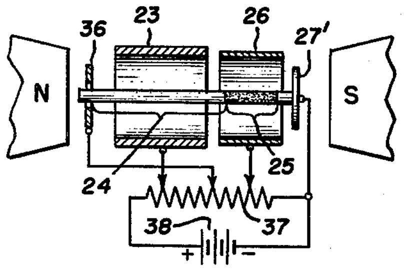
Figure 6 is a fragmentary schematic illustration of still another modified form of the invention.

The modifications of Figures 4 and 5 can be readily combined in a structure shown schematically in Figure 6. The elements designated by the numerals 23, 24, 25, 26, 27' have the same functions as those designated by the same numerals in Figure 4. But the electron bombardment of the high-resistivity conductive cylinder 23 is reduced or eliminated by the presence of an electron attraction electrode 36 which, when raised to a positive potential, attracts a certain proportion of the electrons. The three positive potentials of the electrodes 23, 26, 36 are picked up on a potentiometer 37 fed by a source 38.

Figure 7:
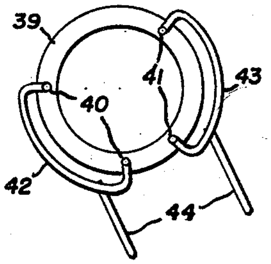
Figure 7 illustrates a modified manner of interconnecting the conductors of the high-resistivity cylinder.
Figure 8:
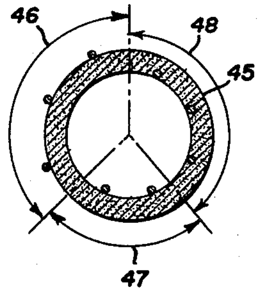
Figure 8 illustrates alternative modified constructions of the cylinder and filamentary conductors.
Figure 8:
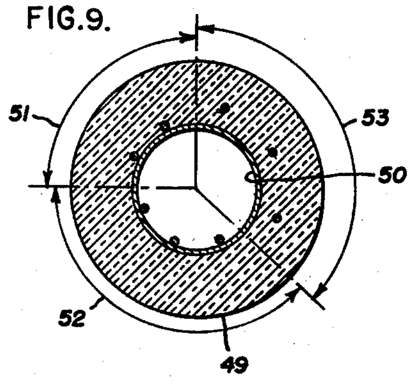
Figure 8:
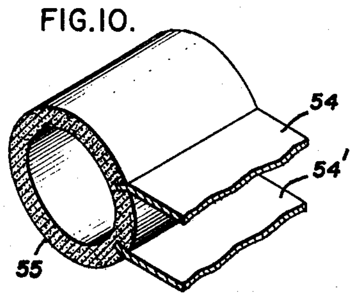
Figure 8:
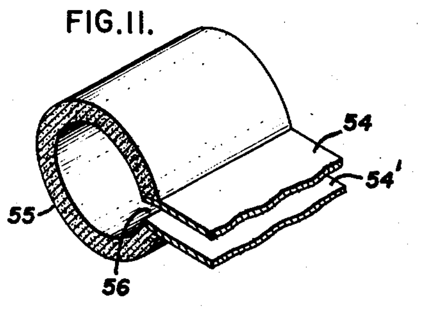

As regards the system of conducting bars inserted in the high-resistivity cylinders and designed to fix the mode of the wave, it is not necessary that these conductors be equally spaced on the circumference of the cylinder. It is important, however, that these conductors which are interconnected be spaced by a whole multiple of a charge wavelength. It is possible, for example, as shown in Figure 7, to insert in a high-resistivity body 39 two sets of conductors 40 and 41, wherein each set consists only of two conductors spaced by one charge wavelength and interconnected by conductive connections 42 and 43. The conductors of one of the sets are spaced from those of the other set by an odd multiple of a half wavelength of the charge. A high frequency output line 44 is connected to the connections 42 and 43. Also, instead of inserting the conducting bars in the mass of high resistance material of the body of the cylinder, their effectiveness may be insured by other arrangements, of which the structures of Figures 8 and 9 are examples. In the arrangement shown in Figure 8, the cylindrical body 45 consists entirely of a low conducting or high-resistivity conductive material. Different alternatively or combinationally employable examples of arrangements of the bars are shown for three sectors 46, 47 and 48 of this body. In sector 46, the conductive bars are suitably mounted on the external surface of the cylinder 45; in sector 47, the bars are similarly mounted on the internal surface of the cylinder; and in sector 48, the bars are imbedded in the material of the cylinder so as only to be slightly exposed at the internal surface of the cylinder. Thus, it will be seen that these bars make contact only with the inside surfaces or the outside surfaces of the body. In Figure 9 is shown an insulating cylindrical body 49 covered on the inside surface with a very thin metal layer 50 obtained by the sublimation of metal vapor. In this embodiment the cylinder, instead of being made of a single material having a high specific resistance, consists of an insulating cylinder, for example a ceramic cylinder, and a high-resistivity conducting layer covering its inside surface. A high tangential resistance of this layer can be obtained from the high specific resistivity of the deposited material or from the small thickness of the layer. The conductors shown in the sectors 51 and 52 can make direct contact with the layer 50 by being partially imbedded in the cylinder, as in sector 51, or by being directly mounted on the surface of the layer 52, as in sector 52. The conductors of the sector 53 are fully inserted in the insulating mass and are only capacitively coupled with the high-resistivity conductive layer.

Additionally, it is not necessary to couple the output circuit to a system of conducting bars inserted in the high-resistivity body. In Figures 10 and 11 are shown examples of coupling arrangement obtainable without the use of inserted bars. In these two examples, the output lines each have two vane-like branches or strips 54 and 54'. In the arrangement shown in Figure 10, the ends of the vane-like branches or strips 54 and 55' are simply inserted in, without extending through, the wall of a high-resistivity conductive cylinder 55 and the inner ends of the branches are bent toward each other to be radial with respect to the longitudinal axis of the cylinder. The coupling is due to the fact that between the insertion points, an alternating potential difference is established, provided only that these points are not spaced exactly a multiple of one charge wavelength. In the arrangement shown in Figure 11, the cylinder is provided with a radial slot 56 and the ends of the strips 54 and 54' are brazed to the two faces of the slot with the inner edges extending to the inner surface of the cylinder. It is obvious that in this case a voltage will be produced between the ends of the line, provided the slot does not interfere too much with the circulation of the charges in the cylinder. To satisfy this condition, the input impedance of the line should not differ too greatly from the resistance in a tangential direction of the segment of the high-resistivity material cut out of the cylinder to provide the slot.

It is to be understood that the cylinder and conductor arrangements of the various Figures 7–11 are each alternatively employable with the various embodiments of Figures 4–6.

While I have shown and described specific embodiments of my present invention, I do not desire my invention to be limited to the particular forms shown and described, and intend by the appended claims to cover all modifications within the spirit and scope of my invention.

What I claim as new and desire to secure by Letters Patent of the United States is:

1. An electric discharge device comprising an electron source, an annular electrode having a high-resistivity conductive wall adapted for having electrons from said source moved rotationally therein for inductively effecting alternating currents in said wall, and output means including spaced conductors electrically coupled to spaced portions of said wall.

2. An electric discharge device comprising an electron source, an annular electrode having a high-resistivity conductive wall adapted for having electrons from said source moved rotationally therein for inductively effecting alternating currents in said wall, means adjacent at least one end of said annular electrode for retaining electrons therein, and output means including spaced conductors electrically coupled to spaced portions of said wall.

3. An electric discharge device comprising an electron source, a cylindrical electrode having a uniformly high-resistivity conductive wall, said electrode being adapted for having electrons from said source moved rotationally therein for inductively effecting alternating currents in said wall, and output means including circumferentially spaced conductors electrically coupled to spaced portions of said wall.

4. An electric discharge device comprising an electron source, a cylindrical electrode including an insulative base and a high-resistivity conductive internal coating, said electrode being adapted for having electrons from said source moved rotationally therein for inductively effecting alternating currents in said coating, and output means including circumferentially spaced conductors electrically coupled to spaced portions of said wall.

5. An electric discharge device comprising an electron source, a cylindrical electrode having a high-resistivity conductive wall adapted for having electrons from said source moved rotationally therein for inductively effecting alternating currents in said wall, and output means including a pair of sets of elongated conductors extending substantially parallel to the axis of said cylindrical electrode, the conductors of each of said sets being electrically interconnected, and said sets of conductors being spaced from each other and electrically coupled to spaced portions of said wall.

6. An electric discharge device comprising a cylindrical electrode having a high-resistivity conductive wall adapted for having electrons moved rotationally therein for inductively effecting alternating currents in said wall, an elongated emitter concentrically disposed in said cylindrical electrode and being emissive as a function of temperature thereof, and output means including circumferentially spaced conductors electrically coupled to spaced portions of said wall.

7. An electric discharge device comprising an electron emitter, a cylindrical electrode having a high-resistivity conductive wall adapted for having electrons from said emitter moved rotationally therein for inductively effecting alternating currents in said wall, control electrode means disposed adjacent at least one end of said cylindrical electrode for attracting rotationally moving electrons to minimize direct radial impingement thereof on said wall, and output means including circumferentially spaced conductors electrically coupled to spaced portions of said wall.

8. An electric discharge device comprising an elongated electrode including a non-emissive portion and a longitudinally displaced emissive portion, a control electrode for directing electrons from said emissive portion longitudinally in the direction of said non-emissive portion of said elongated electrode, a cylindrical electrode having a high-resistivity conductive wall concentrically disposed about said non-emissive portion and adapted for having electrons from said emissive portion of said elongated electrode moved rotationally therein for inductively effecting alternating currents in said wall, and output means including circumferentially spaced conductors electrically coupled to spaced portions of said wall.

9. An electrode structure comprising a cylindrical base member having a high-resistivity conductive wall, and a plurality of longitudinally extending conductors carried by said base member in circumferentially spaced relation.

10. An electrode structure comprising a cylindrical base member having a high-resistivity conductive wall, and a pair of sets of longitudinally extending conductors carried by said base member with the conductors of different sets in interdigital circumferentially spaced relation.

11. An electrode structure comprising a cylindrical member having a uniformly high-resistivity conductive wall, a pair of sets of longitudinally extending conductors partially embedded in said wall with each set including end portions extending from an end of said wall, annular conductors at each end of said wall inter-connecting the end portions of each set, and said conductors of different sets being in interdigital circumferentially spaced relation.

12. An electrode structure comprising a cylindrical member having a uniformly high-resistivity conductive wall and a plurality of longitudinally extending conductors secured to the external surface of said member in circumferentially spaced relation.

13. An electrode structure comprising a cylindrical member having a uniformly high-resistivity conductive wall, and a plurality of longitudinally extending conductors secured to the internal surface of said member in circumferentially spaced relation.

14. An electrode structure comprising a cylindircal member having a uniformly high-resistivity conductive wall, and a plurality of longitudinally extending conductors partially embedded in said wall in circumferentially spaced relation and being exposed at the inner surface of said member.

15. An electrode structure comprising a cylindrical base insulative member, a high-resistivity conductive coating on the internal surface of said member, and a plurality of longitudinally extending conductors carried by said base member in circumferentially spaced relation.

16. An electrode structure comprising a cylindrical insulative member, a high-resistivity conductive coating on the internal surface of said member, and a plurality of longitudinally extending conductors embedded in said member in radially spaced relation to said coating and in circumferentially spaced relation to each other.

17. An electrode structure comprising a cylindrical insulative member, a high-resistivity conductive coating on the internal surface of said member, and a plurality of longitudinally extending conductors secured to the surface of said coating in circumferentially spaced relation to each other.

18. An electrode structure comprising a cylindrical insulative member, a high-resistivity conductive coating on the internal surface of said member, and a plurality of longitudinally extending conductors partially embedded in said member in circumferentially spaced relation and electrically contacting said coating.

19. An electrode structure comprising a cylindrical member having a high-resistivity conductive wall, and a pair of vane-like conductors extending longitudinally and substantially radially into said member in circumferentially spaced relation.

20. An electrode structure comprising a cylindrical member having a high-resistivitiy conductive wall and a circumferential segment removed, and a pair of vane-like conductors extending longitudinally and substantially radially into said member on the sides of the portion where said segment is removed.

21. High frequency apparatus comprising a cathode, an annular electrode having a high-resistivity conductive wall, and means effecting a magnetic field longitudinally through said annular electrode for rotating electrons emitted by said cathode in said annular electrode, thereby to effect inductively alternating currents in spaced portions of said walls, the inside radius of said annular electrode $r$ in centimeters, said means for effecting a magnetic field B in gauss, and the voltage of said annular electrode with respect to the cathode voltage U being so dimensioned that for a frequency $f$ the condition $$f=5.5\times10^7 U/r^2 B$$

is satisfied.

22. An electrode structure comprising a cylindrical base member having a high-resistivity conductive wall, two pairs of longitudinally extending spaced conductors embedded in said wall, the angular distance between the conductors of the same pair being an even multiple, the angular distance between conductors of different pairs being an odd multiple of the same angle, a conductive connection between the conductors of each pair, and a conductive lead extending from each interconnection.

References Cited in the file of this patent

UNITED STATES PATENTS

| | | |
|---|---|---|
| 2,432,466 | Burns | Dec. 9, 1947 |
| 2,508,280 | Ludi | May 11, 1950 |
| 2,635,211 | Crawford et al. | Apr. 14, 1953 |
| 2,679,615 | Bowie | May 25, 1954 |
| 2,681,427 | Brown et al. | June 15, 1954 |
| 2,760,111 | Kumpfer | Aug. 21, 1956 |
| 2,810,096 | Peters et al. | Oct. 15, 1957 |
| 2,824,261 | Peters et al | Feb. 18, 1958 |

FOREIGN PATENTS

| | | |
|---|---|---|
| 1,006,335 | France | Jan. 23, 1952 |